(12) United States Patent
Gesten

(10) Patent No.: US 7,044,615 B2
(45) Date of Patent: May 16, 2006

(54) AUDIO ASSEMBLY AND CONNECTION SYSTEM FOR HATS

(76) Inventor: Jeffrey L. Gesten, 7504 Cedar Hurst Ct., Lake Worth, FL (US) 33467

( * ) Notice: Subject to any disclaimer, the term of this patent is extended or adjusted under 35 U.S.C. 154(b) by 81 days.

(21) Appl. No.: 10/668,380

(22) Filed: Sep. 23, 2003

(65) Prior Publication Data

US 2004/0128737 A1 Jul. 8, 2004

Related U.S. Application Data

(60) Provisional application No. 60/438,623, filed on Jan. 8, 2003.

(51) Int. Cl.
*F21V 33/00* (2006.01)
(52) U.S. Cl. .................. 362/106; 362/86; 362/253; 2/422; 2/906; 2/209.13
(58) Field of Classification Search .............. 362/105, 362/106, 86, 253, 396; 2/422, 906, 209.13, 2/175.1, 195.2, 171; 446/27
See application file for complete search history.

(56) References Cited

U.S. PATENT DOCUMENTS

| | | |
|---|---|---|
| 4,918,759 A | 4/1990 | Anderson |
| 5,181,139 A | 1/1993 | Benitez |
| 5,410,746 A | 4/1995 | Gelber |
| 5,438,698 A | 8/1995 | Burton |
| 5,510,961 A * | 4/1996 | Peng ................. 362/106 |
| 5,522,092 A | 6/1996 | Streb |
| 5,581,807 A | 12/1996 | Peterson |
| 5,615,413 A | 4/1997 | Bower |
| 5,741,060 A | 4/1998 | Johnson |
| 5,881,160 A | 3/1999 | Sheppard |
| 5,884,337 A | 3/1999 | Dudley, Jr. |
| 5,903,927 A * | 5/1999 | Wolfe et al. ............... 2/209.13 |
| 5,987,640 A | 11/1999 | Ryder |
| 6,007,198 A | 12/1999 | Burton |
| 6,032,291 A | 3/2000 | Asenguah |
| 6,275,992 B1 | 8/2001 | Bondy |
| 6,455,188 B1 * | 9/2002 | McKay et al. ............... 429/97 |
| 2001/0040109 A1 * | 11/2001 | Yaski et al. ................ 206/320 |

FOREIGN PATENT DOCUMENTS

GB 2268043 A * 1/1994

\* cited by examiner

*Primary Examiner*—Thomas M. Sember
(74) *Attorney, Agent, or Firm*—David P. Lhota; Stearns Weaver Miller

(57) ABSTRACT

An audio system and hat connection assembly incorporated into or adapted for connecting to a hat and comprising a first connection plate and corresponding second connection plate that connect through or to the bill or hat material wherein the first section is adapted for storing the audio circuit and speaker components and connects to the second section in a manner that grips the hat material and provides access to the audio controls. In an alternative embodiment, the connection assembly may comprise a clip that secures the audio system to the hat without penetrating it. The assembly includes storage space for securing at least one speaker and audio system, which may be adapted for storing other items, such as money and keys.

18 Claims, 8 Drawing Sheets

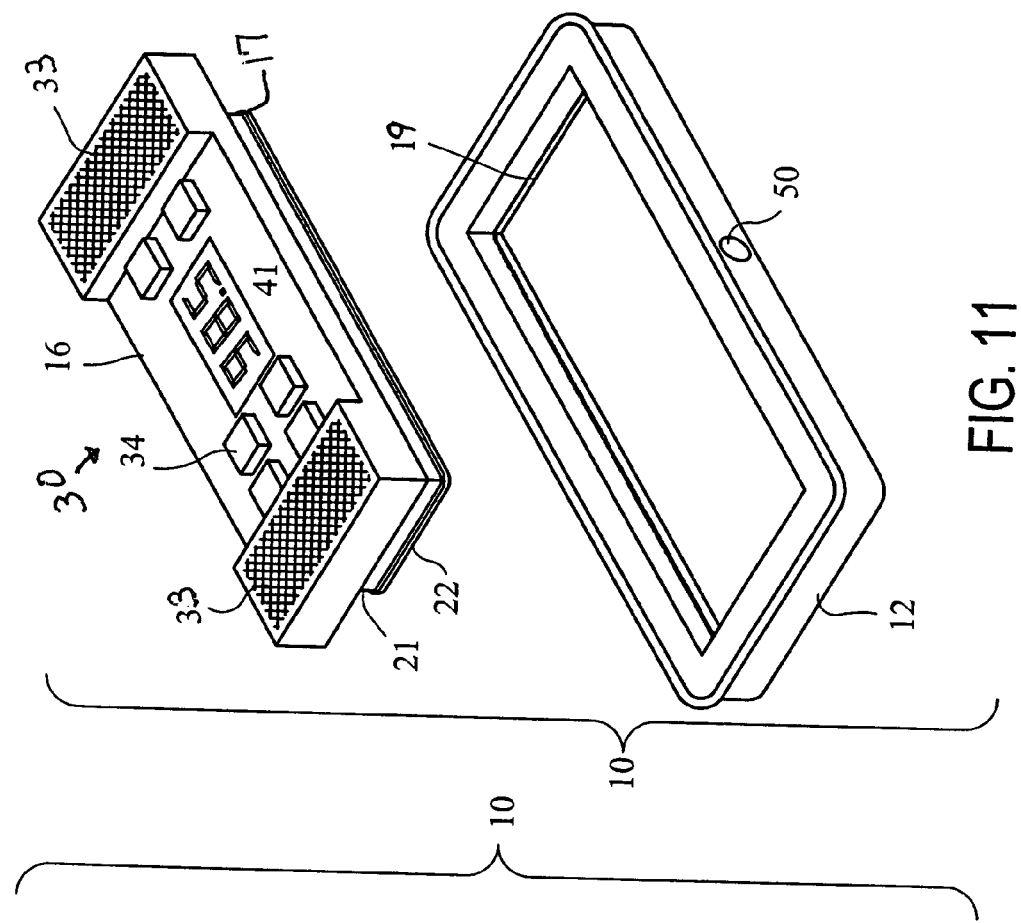
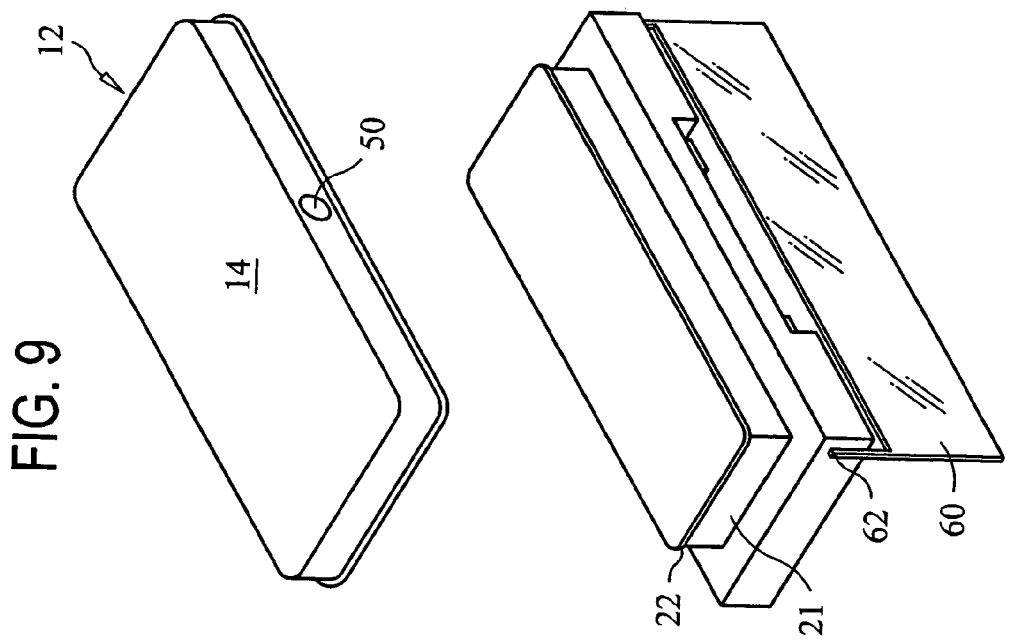

AUDIO ASSEMBLY AND CONNECTION SYSTEM FOR HATS

CROSS REFERENCE TO RELATED APPLICATIONS

This application claims the benefit of provisional patent application Ser. No. 60/438,623 filed Jan. 8, 2003.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to a storage and connection system for hats or visors, and more particularly, to a radio, speaker and connection assembly that connects to a hat, such as the bill of a baseball cap, and that may be adapted for other accessories such as a flashlight or rotatable sun shield.

2. Description of the Background Art

Baseball caps and portable radios are well known and popular. Existing baseball caps comprise a bill and head cover. Portable radios known in the art include those adapted into headsets or sold under the trademark Walkman. Although awkward, oftentimes people simultaneously wear baseball caps and portable radios. This, however, can be uncomfortable and dangerous. Portable radios and headsets typically fit up against the ear or in the ear in a manner that drowns out ambient noise. Consequently, outside noises that would typically warn of potential danger go unnoticed, which can result in life threatening accidents. In addition, existing portable radio devices are not always adapted for convenient hands-free portability and use. Moreover, it is sometimes desirable to have an additional storage place for personal items, such as keys and money, and, or other accessories, such as a flashlight and, or sunshield, conveniently available. Additional accessories such as these would be conveniently available if embodied in a hat, such as a baseball cap. There are no known audio assembly systems for hats or baseball-styled caps having these attributes.

The background art discloses various devices that are connectable to a hat, however they fail to adequately address the foregoing as contemplated by the instant invention. For instance, U.S. Pat. No. 4,918,759, issued to Anderson, discloses a timekeeping cap with a crown portion placed on the head of a human, a visor portion extending from the crown portion for shade which has a cavity which opens to the lower surface of the visor portion, and a clock which is positioned within the cavity which includes a clock face through which time may be viewed. U.S. Pat. No. 5,181,139, issued to Benitez, discloses retractable binoculars, used in combination with and attached to a visor, the binoculars structured and fitted to be positioned under the side of the visor, or may be extended in a viewing position where an individual may look through the binoculars supportably attached to the visor being worn. U.S. Pat. No. 5,410,746, issued to Gelber, discloses a cap having a crown, a brim and an internal sweatband or flap, combined with an electronic receiving device, such as a radio, which is connected to the inner surface of the flap by a double-sided adhesive strip. A battery holder is mounted to the flap on the other side of the brim by a second double sided adhesive strip and a second backing element. Earphones are connected to the radio by wires on the opposite side of the radio. U.S. Pat. No. 5,438,698, issued to Burton, discloses a wearable audio reception device with a flexible enclosure removably attachable to an article of clothing, the radio also being removably attachable to the flexible enclosure. U.S. Pat. No. 5,522,092, issued to Streb, discloses a cap with sleep posture alarm comprised of a cap adapted for receiving a user's head, alarm circuitry for generating an alarm signal when electrically energized, at least one speaker for transmitting an alarm based upon receipt of an alarm signal, and a power source for providing electrical energy to the alarm circuitry. U.S. Pat. No. 5,581,807, issued to Peterson, discloses headgear including a light-filtering visor which may be used with caps, hats, and headbands. The light-filtering visor may be flipped downward to an operative position, or upward to an inoperative position. U.S. Pat. No. 5,615,413, issued to Bower, discloses an eye shield for a visor or cap bill which may be removably attached to the bill of a visor or cap by pressing clips onto the right edge and the left edge of the bill. U.S. Pat. No. 5,741,060, issued to Johnson, discloses a combination baseball style cap and light assembly. The cap has a crown, a bill extending from the crown, a sweatband liner circumscribing the bottom edge of the cap, and a reinforcing crown liner, and a double light and switch assembly comprising two lamp sockets affixed to a mounting plate on each side of a sealed sub-mini micro switch also affixed to the mounting plate. U.S. Pat. No. 5,881,160, issued to Sheppard, discloses a cap having a tape playing apparatus, and at least one speaker positionable near the ear openings of the wear for playing desired tapes while the wearer is sleeping. The tape playing apparatus is positioned at the crown of the cap to allow the user to sleep comfortably when the cap is in use. U.S. Pat. No. 5,884,337, issued to Dudley, discloses a flexible mirror that can be attached to a variety of items of apparel. The mirror includes a low strength magnet and a hinge member, which pivotally secures the flexible mirror to a flexible surface of an item of apparel. U.S. Pat. No. 5,987,640, issued to Ryder, discloses a visor and eyeshield combination which allows the wearer to adjust the eyeshield by flipping the eyeshield up to a rest position or down to an in-use position. By adjusting the distance of the eyeshield downward from the visor, in order to accommodate eyeglasses and/or facial contours. U.S. Pat. No. 6,032,291, issued to Asenguah, discloses an apparatus providing solar powered air circulation to the face and upper body of the user. Mounting photoelectric cells to the apex of the top of a hat is provided which cells are connected by wire to a directionally selective fan which is located under the brim of the hat. U.S. Pat. No. 6,007,198, issued to Burton, discloses a mirror attachment for eyeglasses, which is a lightweight rectangular mirror attached to the temple piece of a pair of eyeglasses by a hinged arm. The mirror may be folded to a closed position generally parallel to the temple piece when not in use, and extended to a vertical plane of the eyeglass lens when in use. U.S. Pat. No. 6,275,992, issued to Bondy, discloses an eye shield assembly for use in conjunction with a hat having a brim. The assembly includes a frame and a lens mounted to the frame. The opposite sides of the frame are pivotally secured to the hat brim so that the frame is movable between a storage position and an operational position.

Based on the foregoing, the background devices fail to disclose an audio assembly system for a hat or hat-like device having or being adaptable for having a built in radio/player and speaker assembly with the option for additional accessories, such as storage, flashlight and, or sun-shield, as contemplated by the instant invention. If a device and, or system existed that could conveniently combine a hat, such as a baseball cap or visor, with a hands-free audio assembly system that can be heard without blocking ambient noise it would be well received. Such a device would also be well received with additional accessories. The instant invention addresses this unfulfilled need in the prior art by providing a radio and connection system that is adapted for attachment to the bill of a baseball cap.

BRIEF SUMMARY OF THE INVENTION

In light of the foregoing, it is an object of the present invention to provide a connection system that is adaptable for mounting to a hat, such as a baseball cap or visor, and for storing items such as a radio, player, speaker system, personal items, flashlight and, or sun shield.

It is another object of the instant invention to provide a stereo-hat system that is adaptable for mounting to a hat, such as a baseball cap or visor, and, or includes a hat having a stereo or comparable player attached or attachable thereto.

It is also an object of the instant invention to provide a stereo-hat system that is lightweight so as to not affect the comfort of the hat.

In light of these and other objects, the instant invention comprises an audio system and hat connection assembly incorporated into or adapted for connecting to a hat, such as the bill or rim of a baseball cap or visor. In the preferred embodiment, the invention includes a connection system that secures at least one speaker and radio receiver, or other player, to the bill of a baseball cap or other hat having a rim or material that can be utilized with the invention. The invention may also include the hat or cap and, or a hat or cap having a prefabricated aperture formed in the bill for mounting the connection and radio-speaker assembly. The connection assembly is designed to secure a speaker system, audio receiver or other player with control knobs to the bill, rim or material of a hat. The connection assembly comprises a first connection plate and corresponding second connection plate that connect through or to the bill or hat material. One plate is adapted for storing the audio circuit and speaker components while the other plate is adapted for connecting to the first one wherein one plate at least partially extends through the hat allowing the second plate to connect to it thereby gripping the hat to secure the assembly. In an alternative embodiment, the connection assembly may comprise a clip that secures the audio system to the hat without penetrating it. The connection assembly may also accommodate and secure accessories, such as a personal items, keys, money, flashlight, amplifier, infrared receiver, microphone, strobe light, batteries, magnifying lens, rear view mirror and, or rotatable sunglass shield. The audio system accommodates the storage and securing of at least one speaker system and audio receiver or player.

In an alternative embodiment, the audio system may provide just speakers and a wire assembly or harness that extends outside the connection assembly for plugging into an auxiliary radio or player. In another embodiment, the radio or player may be provided and secured in the connection assembly.

BRIEF DESCRIPTION OF THE SEVERAL VIEWS OF THE DRAWINGS

FIG. 9 is a top perspective exploded view of the preferred embodiment of the audio system with a rotatable shield in accordance with the another embodiment of the instant invention.

FIG. 11 is a bottom perspective exploded view of the preferred embodiment of the audio system in accordance with the instant invention.

DETAILED DESCRIPTION OF THE INVENTION

Figure 1:
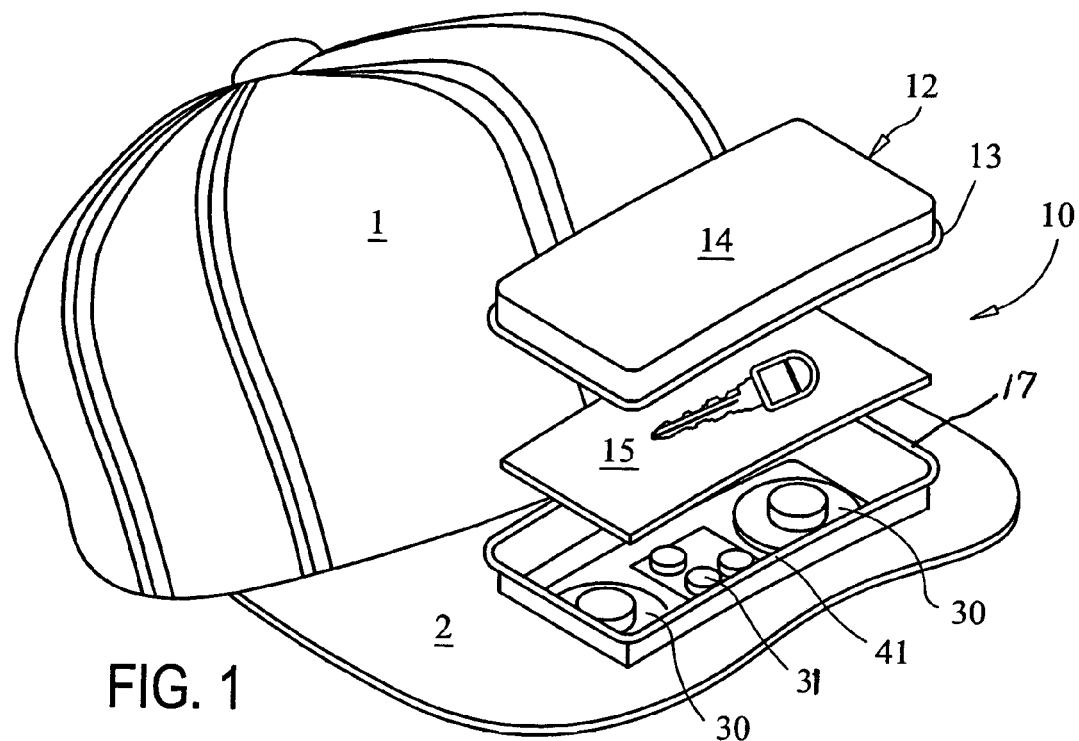
FIG. 1 is a front perspective exploded view of the preferred embodiment of the audio hat assembly in accordance with the instant invention.
Figure 2:
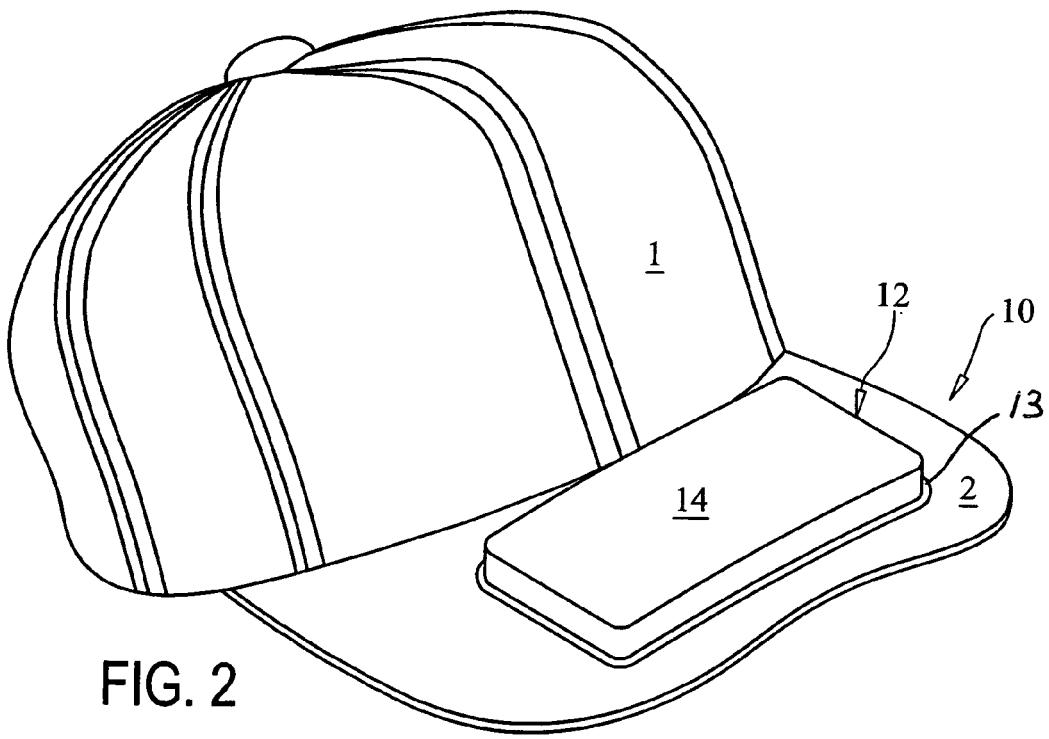
FIG. 2 is a front perspective view of the preferred embodiment of the audio hat assembly in accordance with the instant invention.

With reference to the drawings, FIGS. 1–15 depict the preferred and alternative embodiments of the instant invention which is generally referenced as an audio hat assembly and, or by numeric character 10. The audio hat assembly 10 generally comprises a connection assembly 12 adapted for attachment to a hat and for securing at least one audio system 30 to a hat, such as the bill or rim of a cap 1. The invention 10 may also include a conventional hat having at least one prefabricated aperture formed in a bill or rim for mounting the connection assembly 12. The audio hat assembly 10 accommodates the storage and securing of at least one audio system 30 comprising speakers 33, audio player 41, preferably an audio receiver, control knobs or buttons 34, batteries 31 and other electronics required to run and operate the audio player 41. In an alternative embodiment, the audio hat assembly 10 may provide speakers 33 and a wire assembly or harness that extends outside the connection assembly 12 for plugging into an auxiliary radio or player. In another embodiment, the audio hat assembly 10 may include a headphone receptacle 45, shown in FIG. 4, adapted for mechanically and electrically connecting a set of headphones to the assembly 10. When using a set of headphones, the speakers 33 may be disabled.

In another alternative embodiment, the connection assembly 12 may be adapted for storing personal items, such as keys and money and may also accommodate and secure other accessories, such as a flashlight 50, global positioning system (GPS), compass, survival items, pre-recorded tapes, discs or chips, amplifier, infrared receiver, microphone, strobe light, batteries, magnifying lens, rear view mirror and, or rotatable sunglass shield 60. A separation plate 15 may be provided and inserted in the cavity 40 of the second plate 16 to separate personal items from the audio components. The cavity walls may include ridges 35 for supporting the plate 15.

Figure 3:
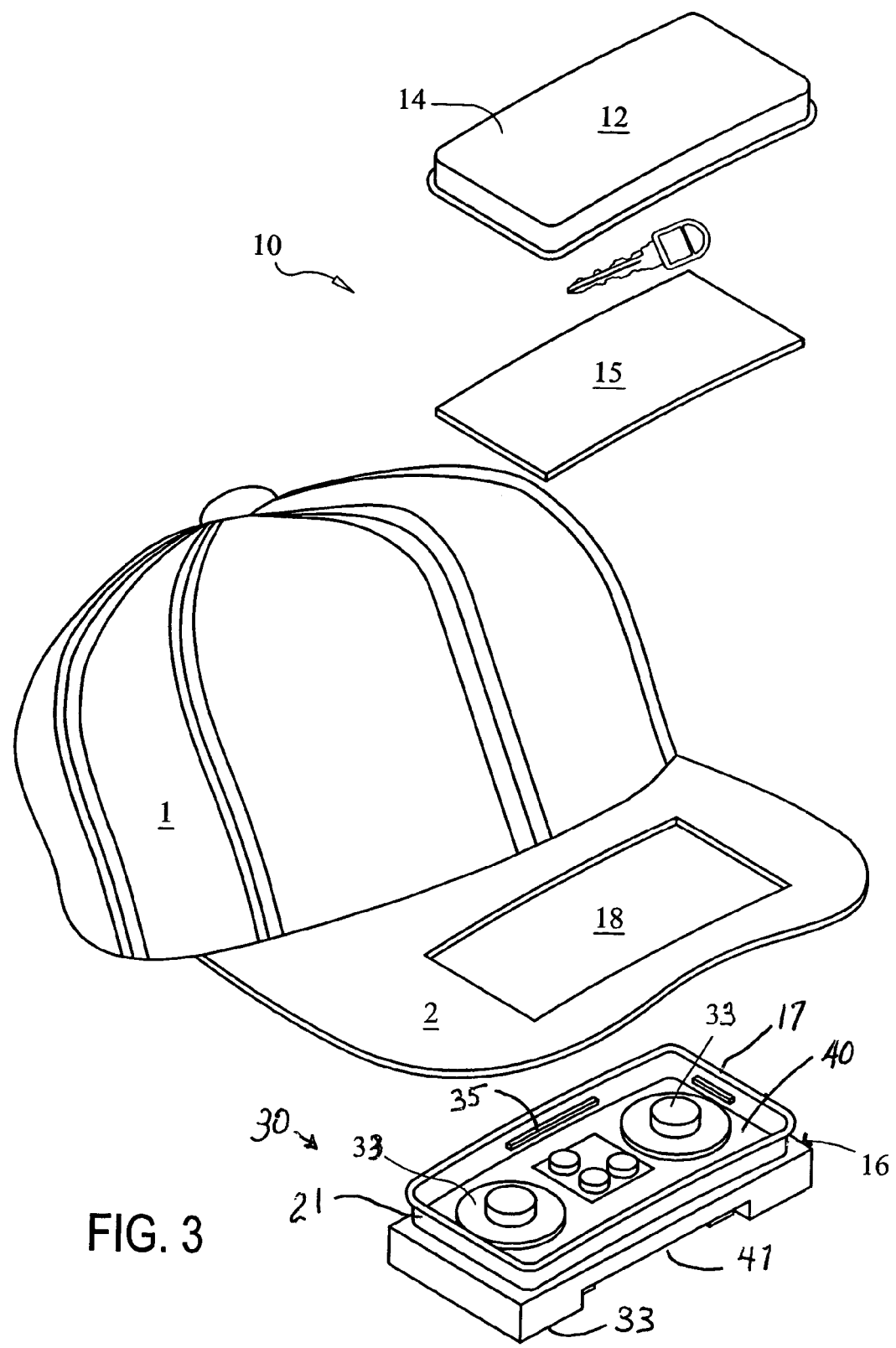
FIG. 3 is a front exploded view of the preferred embodiment of the audio hat assembly in accordance with the instant invention.
Figure 4:
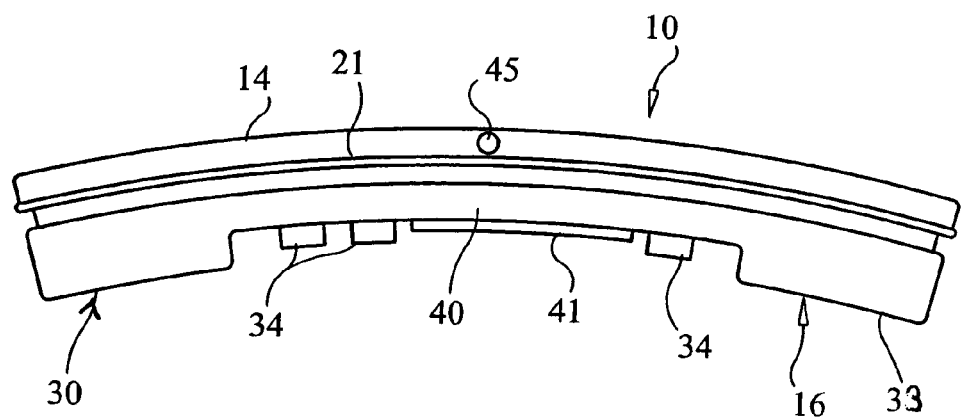
FIG. 4 is an elevational view of the preferred embodiment of the audio hat assembly without the hat in accordance with the instant invention.
Figure 5:
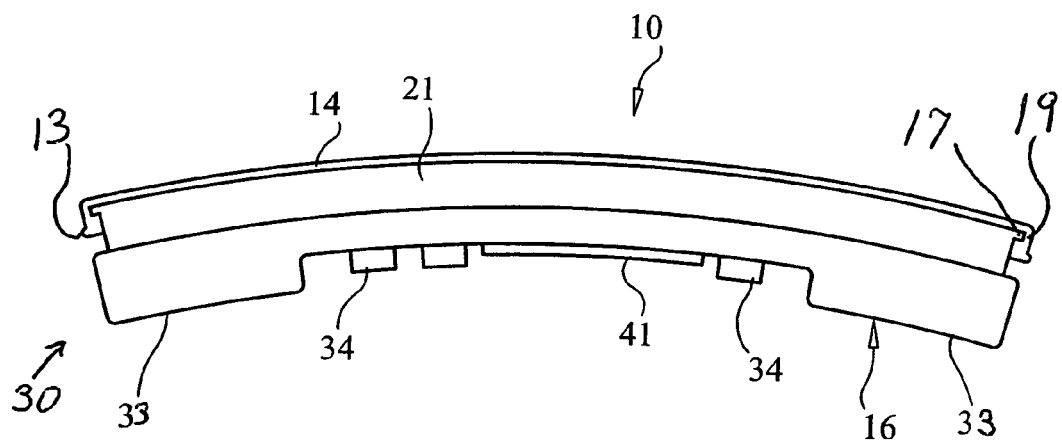
FIG. 5 is a partial cutaway view of the preferred embodiment of the audio hat assembly without the hat illustrating the connection between the first and second plate in accordance with the instant invention.

With reference to FIGS. 1–15, the connection assembly 12 comprises a first connection plate 14, second connection plate 16, interlocking system 17–21 for connecting the first and second plates 14, 16 together, audio receiver storage cavity 40 and structure for mounting the assembly 12 to a hat. With reference to FIG. 3, in the preferred embodiment, an aperture 18 is required in the hat to facilitate interlocking the first and second connection plates 14, 16. In an embodiment having a hat, the hat comprises at least one receptacle 18 for receiving and securing the first and second plates 14, 16. One plate defines an interlocking channel 19 while the other plate defines the corresponding locking flange 17, which interlocks with the channel 19. For instance, the first plate 14 may define the interlocking channel 19 and the second plate 16 may define the interlocking flange 17. The second plate 16 includes a projecting plug or walls 21 that define the interlocking flange 17 around its perimeter. The plug 21 may be described as the walls 21 of the second plate 16 that help define a storage cavity 40 in the second plate 16. The first plate 14 is adapted for receiving and securing the plug 21 in a manner that facilitates the interlocking of the flange 17 and channel 19 and the sandwiching of the hat material around the peripheral edges of the first and second plates 14, 16. The first and second plates 14, 16 preferably snap together through at least one receptacle 18 formable or preexisting in the rim or bill 2 of a hat. The width and length of the plug 21 is substantially the same as the width and length of the receptacle 18 to facilitate a snug fit. The first plate 14 preferably defines the interlocking channel 19, which is formed in the interior surface, and the lower plate 16 defines a corresponding interlocking flange 17 around the plug 21, as shown in FIGS. 3–5. Alternatively, the plug 21 may define the channel 19 and the first plate 14 may define the interlocking flange 17. The flange 17 and channel 19 releasably snap together when the plug 21 is inserted in the first plate 14 and release when the plates 14, 16 are pulled apart.

With reference to FIGS. 1–6, 8 and 10, the audio system 30 comprises audio components that are stored and secured in the cavity 40 defined by the second plate 16. The audio system 30 may comprise speakers 33, audio player 41, such as a receiver or CD player, batteries 31 and other required components known in the art. The controls 34, player 41 and display are preferably viewable and accessible from the lower surface of the hat's bill or rim to provide convenient access and viewing for the user. Compartments for batteries 31 and a recharging cord may also be formed in the connection assembly 12. The connection assembly 12 also accommodates controls, such as volume, receiver, tuning, bass, treble, balance and, or other common controls 34. Although the instant invention is described with reference to accommodating a radio receiver 41, it may also be adapted for storing and securing other audio equipment, such as an MP3 player, cellular components, CD player or tape player, without departing from the scope and spirit of the instant invention.

In an alternative embodiment, a biasing tab, such as those known in the art, may be hingedly formed with or attached to one plate 14 or 16 such that it releasably interlocks with the groove. The tab is urged outward when the first and second plates 14, 16 are being joined and returns toward its resting position after bypassing a biasing ridge. The tab is pulled back to disconnect the plates 14, 16.

In another embodiment, as shown in FIGS. 12–15, the connection assembly 12 may comprise a biasing clip 39 for mounting the assembly 10 to a hat without the need for an aperture 18. This embodiment makes the invention 10 accessible for use without having to modify the hat. The clip 39 comprises a biasing member that may be urged from a resting position and returns to the resting position when released. The energy stored and released by the clip 39 when biased and released causes it to grip the hat1, thereby securing the assembly 10. The lower tab of the clip 39 may be sandwiched between the first and second plates 14, 16 or affixed to the upper surface of the top plate 14 with conventional hardware, adhesive, hook-and-loop or other attaching devices known in the art.

In another alternative embodiment, the invention 10 the first plate 14 and second plate 16 may comprise cooperating magnetic fields that magnetically attract the first plate 14 and second plate 16 together. The invention 10 may alternatively comprise hook-and-loop fasteners for mounting the assembly 10 to a hat.

To use the instant invention 10, an aperture 18 of a predetermined size is first formed in the bill 2 of the cap 1. The aperture should have a circumference that is smaller than the connection mechanism 12 so that the bill 2 is sandwiched between the first and second plates 14, 16. Alternatively, the invention 10 may include a baseball cap 1 having the aperture preformed in the bill 2. To attach the audio system 10 to a cap 1, the first and second plates 14, 16 are aligned on the top and bottom of the bill 2 and the plug 21 is inserted into the receptacle 18 until the interlocking ridge 17 and groove 19 interlock. To remove the audio system 10, the first and second plates 14, 16 are pulled apart. In the embodiment employing the clip 39, the first and second plates 14, 16 are snapped together and the clip 39 is slid over the bill or rim of the hat.

Figure 6:
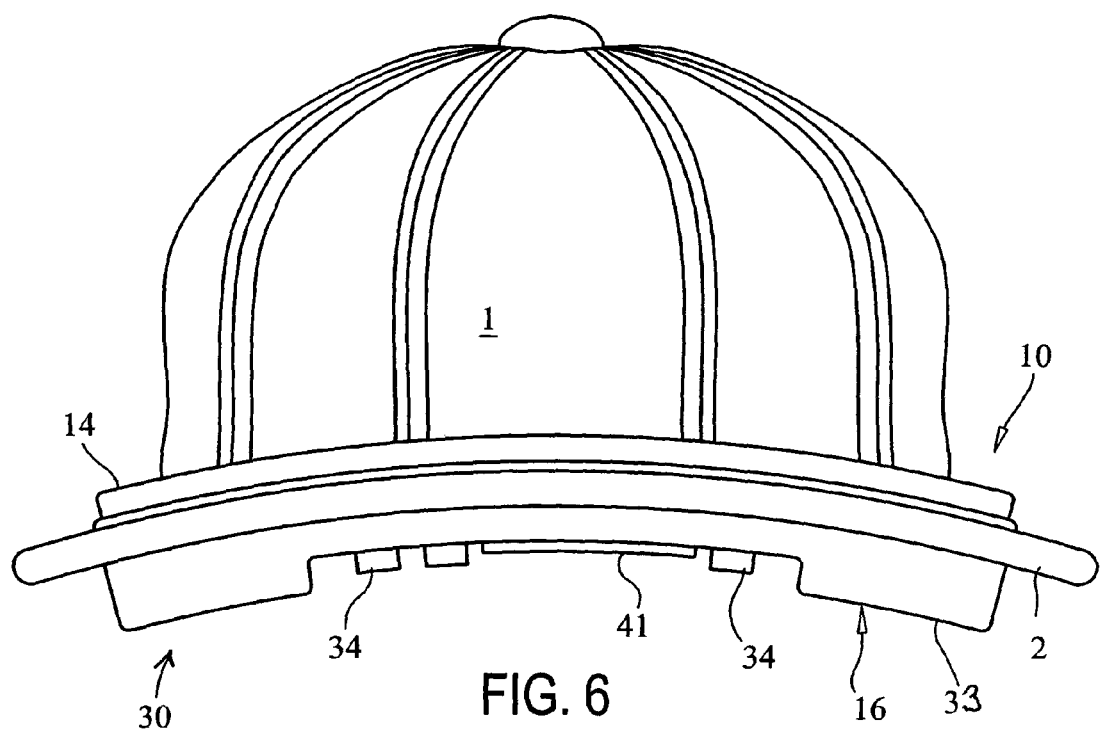
FIG. 6 is an elevational view of the preferred embodiment of the audio hat assembly attached to the bill of a baseball cap in accordance with the instant invention.
Figure 10:
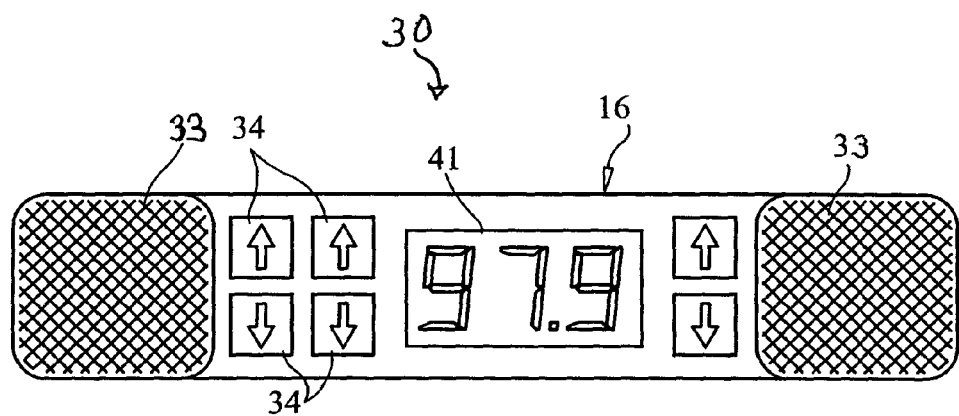
FIG. 10 is a bottom elevational view of the second plate of the audio system in accordance with the preferred embodiment of the instant invention.
Figure 7:
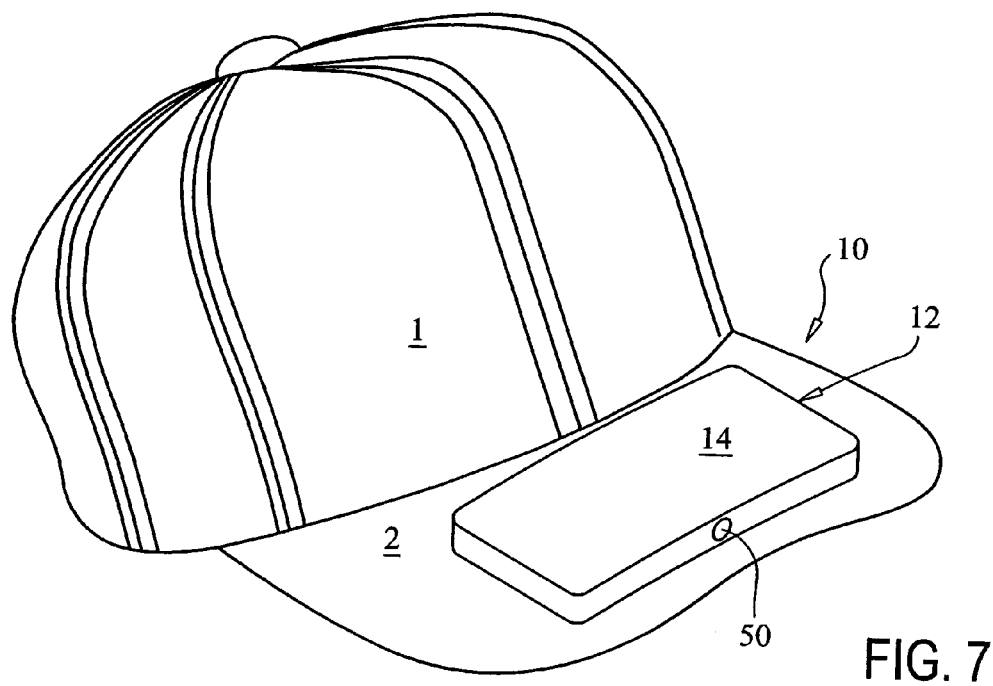
FIG. 7 is a perspective view of the audio system attached to the bill of a baseball cap in accordance with the another embodiment of the instant invention.
Figure 8:
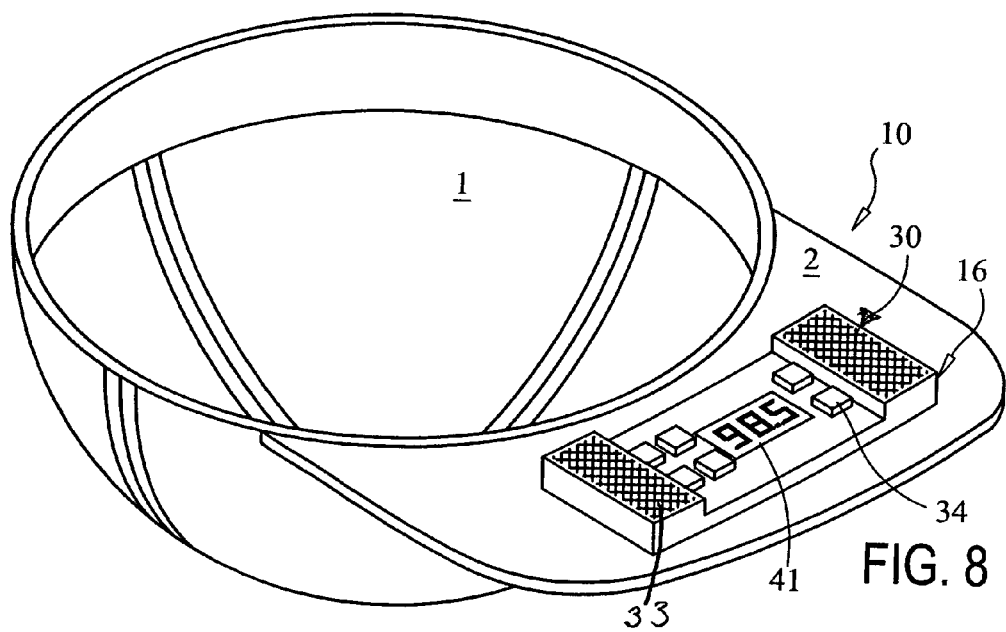
FIG. 8 is a bottom perspective view of the audio system attached to the bill of a baseball cap in accordance with the preferred embodiment of the instant invention.
Figure 12:
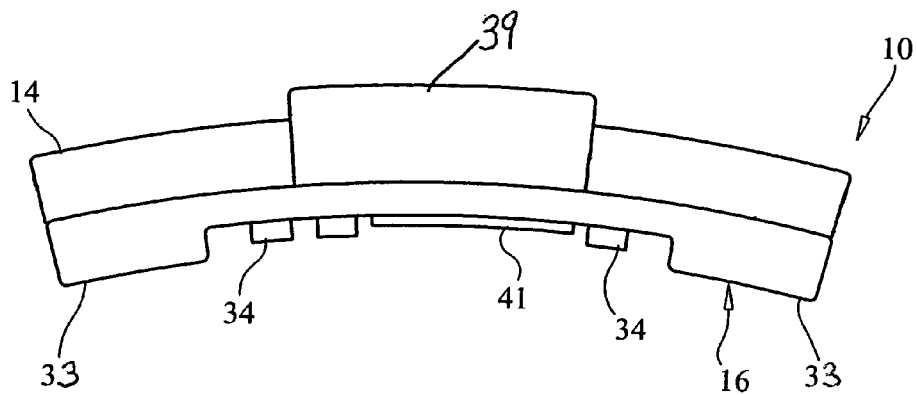
FIG. 12 is an elevational view of an alternative embodiment of the audio hat assembly having a mounting clip in accordance with the instant invention.
Figure 13:
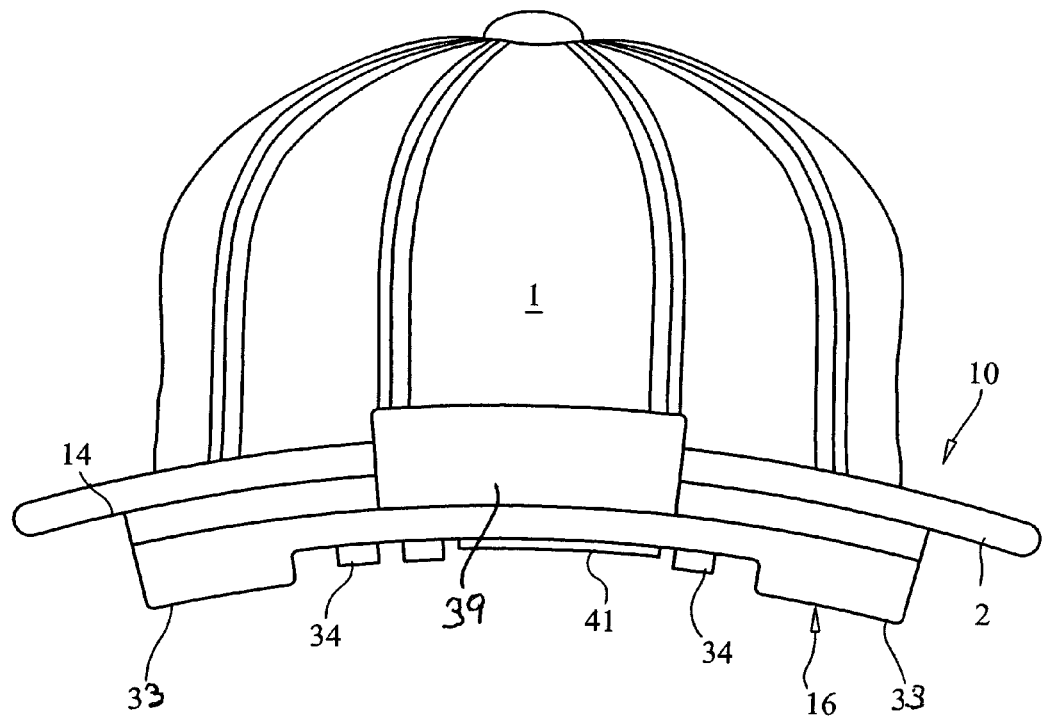
FIG. 13 is an elevational view of the alternative embodiment of the audio hat assembly shown in FIG. 12 mounted to a hat in accordance with the instant invention.
Figure 14:
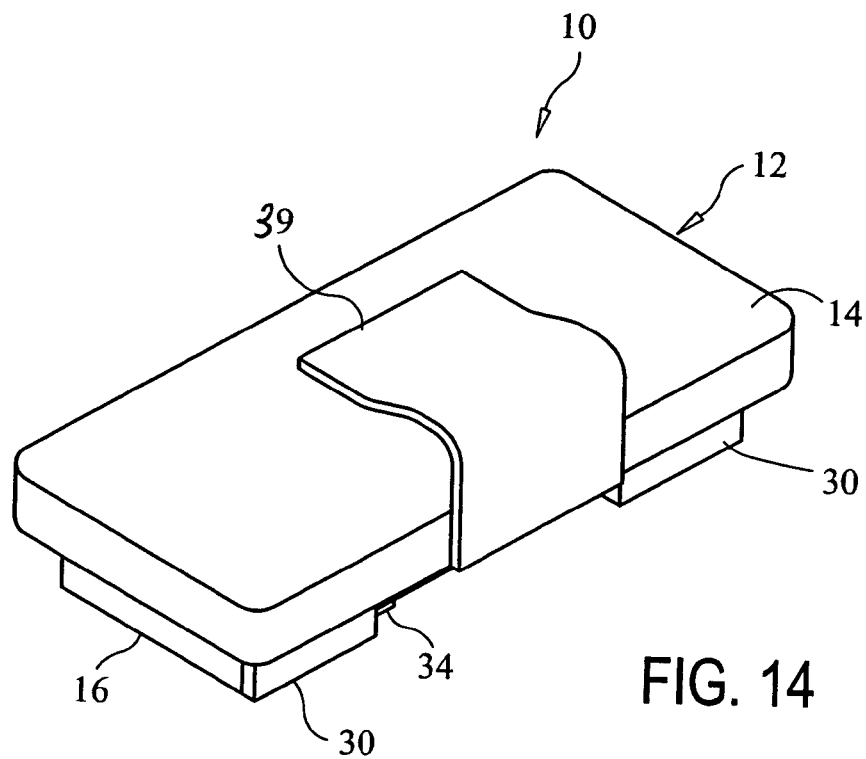
FIG. 14 is a perspective view of an alternative embodiment of the audio hat assembly having a mounting clip in accordance with the instant invention.
Figure 15:
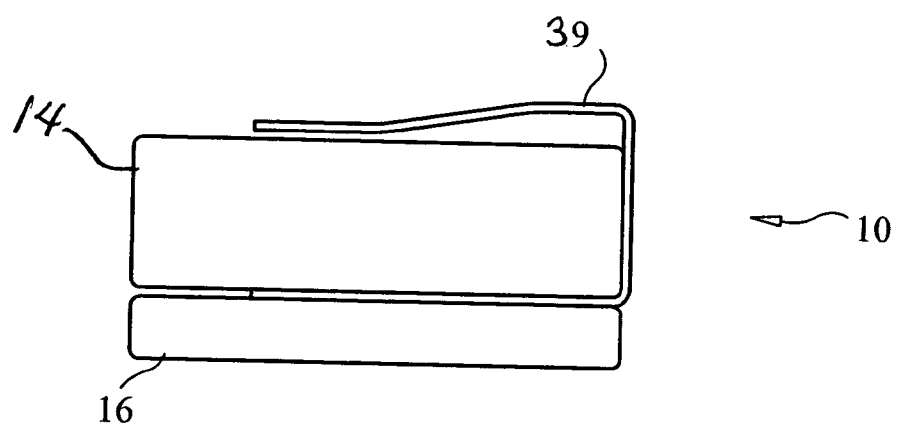
FIG. 15 is a side elevational view of an alternative embodiment of the audio hat assembly having a mounting clip in accordance with the instant invention.

With reference to FIG. 6, the connection assembly 12 may be adapted for and, or include at least one accessory 50 such as a flashlight, infrared receiver, strobe light and, or microphone. A separate cavity may be formed for storing, securing and, or accommodating one or more of these accessories along with a power source, such as batteries and a switch. The audio system 10 may include a solar panel 19 on the top plate for recharging the battery source, as shown in FIGS. 1 and 5. In an alternative embodiment, the instant invention 10 may include an adapter 45 for mechanically and electrically connecting headphones to the assembly 12.

With reference to FIG. 5, the connection assembly 12 may be adapted for securing and, or including pivoting accessories 60, such as a sun shield, magnifying glass or rear view mirror. In this embodiment, either the first or second plate 14, 16 include a securing aperture for rotatably receiving and supporting pins 62.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. An audio hat connection assembly for connecting to hat material, said assembly comprising:
   a first section;
   a second section having a cavity adapted for storing items;
   at least one audio speaker and means for producing audio being stored in said cavity;
   means for joining said first section and said second section; and
   means for mounting the assembly to the hat material comprising dimensions defined by said first section and said second section that facilitate sandwiching the hat material between a portion of said first section and said second section when said first and second sections are joined together.

2. An assembly as recited in claim 1, wherein said joining means comprises:
   a groove defined by said first section; and
   a corresponding flange defined by said second section wherein said flange and groove releasably snap together when said first section and said second section are joined.

3. An assembly as recited in claim 2, further comprising: a hat.

4. An assembly as recited in claim 3, wherein said mounting means further comprises:
   an aperture formed in the hat material.

5. An assembly as recited in claim 1, further comprising a hat.

6. An assembly as recited in claim 1, further comprising a hat.

7. An assembly as recited in claim 1, further comprising a plate for covering said audio means.

8. An assembly as recited in claim 1, wherein said mounting means comprises a clip secured to said assembly.

9. An assembly as recited in claim 1, wherein said mounting means comprises hook-and-loop fasteners.

10. An assembly as recited in claim 1, wherein said mounting means comprises magnets secured to said first and second sections.

11. An assembly as recited in claim 1, further comprising controls for operating the audio means.

12. An assembly as recited in claim 1, further comprising:
    a shield rotatably attached to said assembly.

13. An assembly as recited in claim 1, further comprising means for attaching an auxiliary audio head set.

14. An assembly as recited in claim 1, further comprising a flashlight in said assembly.

15. An assembly as recited in claim 1, further comprising:
    means for storing personal items.

16. An assembly as recited in claim 15, wherein said storing means comprises a storage compartment in said cavity and means for separating it from said audio means.

17. An assembly as recited in claim 15, wherein said separating means comprises a plate.

18. An audio hat connection assembly for connecting to hat material, said assembly comprising:
    a first section;
    a second section having a cavity adapted for storing items;
    at least one audio speaker and means for producing audio being stored in said cavity;
    means for joining said first section and said second section; and
    means for mounting the assembly to the hat material, said mounting means comprises magnets secured to said first and second sections.

* * * * *